United States Patent
Wagner

(10) Patent No.: US 8,882,151 B2
(45) Date of Patent: Nov. 11, 2014

(54) FILLING DEVICE

(71) Applicant: Veritas AG, Gelnhausen (DE)

(72) Inventor: Artur Wagner, Biebergemuend (DE)

(73) Assignee: Veritas AG, Gelnhausen (DE)

( * ) Notice: Subject to any disclaimer, the term of this patent is extended or adjusted under 35 U.S.C. 154(b) by 107 days.

(21) Appl. No.: 13/627,488

(22) Filed: Sep. 26, 2012

(65) Prior Publication Data

US 2013/0192714 A1   Aug. 1, 2013

(30) Foreign Application Priority Data

Sep. 27, 2011 (DE) .......................... 10 2011 115 144

(51) Int. Cl.

| | |
|---|---|
| *B60P 3/22* | (2006.01) |
| *B65B 1/00* | (2006.01) |
| *B23P 19/00* | (2006.01) |
| *B60K 15/04* | (2006.01) |
| *B60K 13/04* | (2006.01) |
| *B60K 15/03* | (2006.01) |
| *F01N 3/20* | (2006.01) |

(52) U.S. Cl.
CPC ............... *B65B 1/00* (2013.01); *F01N 2610/02* (2013.01); *B60K 2015/047* (2013.01); *B60K 2015/0474* (2013.01); *B60K 13/04* (2013.01); *B60K 2015/0346* (2013.01); *F01N 2610/1413* (2013.01); *F01N 3/2066* (2013.01); *B23P 19/00* (2013.01); *B60K 15/04* (2013.01)
USPC .......................................................... 280/834

(58) Field of Classification Search
USPC .................... 280/830, 834; 180/69.4; 141/98; 137/351, 602
See application file for complete search history.

(56) References Cited

U.S. PATENT DOCUMENTS

| | | | | |
|---|---|---|---|---|
| 4,150,809 A | * | 4/1979 | Muller | 251/149.4 |
| 4,573,694 A | * | 3/1986 | Goto et al. | 280/834 |
| 6,263,924 B1 | * | 7/2001 | Grosser | 141/102 |
| 6,305,408 B1 | * | 10/2001 | Goto et al. | 137/351 |
| 6,988,506 B1 | * | 1/2006 | Apostolides | 137/13 |
| 8,534,711 B2 | * | 9/2013 | Inoue et al. | 285/62 |
| 8,640,725 B2 | * | 2/2014 | Truitt et al. | 137/1 |
| 2004/0256522 A1 | * | 12/2004 | Takahashi et al. | 248/68.1 |
| 2007/0163673 A1 | * | 7/2007 | Kallberg | 141/383 |

(Continued)

FOREIGN PATENT DOCUMENTS

| | | |
|---|---|---|
| DE | 30 40 517 A1 | 5/1982 |
| DE | 34 22 345 A1 | 12/1985 |

(Continued)

OTHER PUBLICATIONS

Search Report dated Feb. 13, 2013, issued in corresponding European Patent Application No. 12184495.5. (10 pages).
German Search Report for DE 10 2011 115 144.7 dated Sep. 6, 2012.

*Primary Examiner* — Joseph M Rocca
*Assistant Examiner* — Gabriela C Craciun
(74) *Attorney, Agent, or Firm* — Buchanan Ingersoll & Rooney PC

(57) ABSTRACT

The invention relates to a filling device, in particular for filling a tank with a urea solution, comprising: at least one vehicle-specific pipe element, one standardized filler neck, and one holder, wherein the holder is fixed to said vehicle-specific pipe element via a joining method, particularly a welding method, used for the vehicle-specific pipe element, either in axial and/or in radial and/or in circumferential direction of said vehicle-specific pipe element.

16 Claims, 7 Drawing Sheets

(56) References Cited

U.S. PATENT DOCUMENTS

| | | | |
|---|---|---|---|
| 2007/0181215 A1* | 8/2007 | Kaempf | 141/285 |
| 2007/0205193 A1* | 9/2007 | Whipple | 220/86.1 |
| 2008/0210331 A1* | 9/2008 | Compere et al. | 141/2 |
| 2009/0293974 A1* | 12/2009 | Inoue et al. | 137/798 |
| 2011/0100985 A1* | 5/2011 | Tsiberidis | 220/86.2 |
| 2012/0199246 A1* | 8/2012 | Budzyk et al. | 141/383 |
| 2013/0192714 A1* | 8/2013 | Wagner | 141/98 |

FOREIGN PATENT DOCUMENTS

| | | |
|---|---|---|
| DE | 10 2008 034 672 A1 | 1/2010 |
| DE | 20 2010 001 147 U1 | 5/2011 |
| EP | 2 316 685 A1 | 5/2011 |
| FR | 2 875 748 A1 | 3/2006 |

* cited by examiner

FILLING DEVICE

The present invention relates to a filling device, in particular for filling a tank with a urea solution. Furthermore, the invention refers to a construction kit for a filling device and to two methods for producing such filling device.

For many motor vehicles it is required to carry along a urea solution so as to allow nitrous gases to be reduced. To this end, the urea solution is stored in a tank that has to be refilled from time to time. A filling device is required for filling the tank, which comprises a standardized filler neck, e.g. for filling a bottle with urea. To do so, a bottle is screwed to the standardized filler neck so as to enable a trouble-free filling.

To carry along such filling device in the vehicle safely it has to be mounted or fastened at a body part or the like. One mounting option is known e.g. from U.S. Pat. No. 4,573,694 according to which a fuel pipe is mounted to a wheel case by means of an annular bracket. It is, however, disadvantageous that mounting said bracket is time-consuming and that there is lack of variability with regard to different vehicle types so that it might be difficult at times to find suitable mounting points for the annular bracket.

Therefore, it is the object of the present invention to specify a filling device which provides for a variable mounting option and can, thus, be implemented into different vehicle types easily and in a cost-saving manner.

This object is solved by means of the independent claims of the invention.

According to the invention, the filler neck includes at least one vehicle-specific pipe element, one standardized filler neck, and one holder or retainer, such holder being fixed to said vehicle-specific pipe element via a joining method, particularly a welding method, used for the vehicle-specific pipe element, either in axial and/or in radial and/or in circumferential direction of said vehicle-specific pipe element.

Accordingly, the filling device comprises a holder or retainer of a form that can be adapted to diverse vehicle types. Furthermore, said holder has already been fixed to the vehicle-specific pipe element so as to enable simple and quick mounting of the filling device as a whole.

Preferably, the standardized filler neck is connected to the vehicle-specific pipe element by means of the joining method. It has, thus, become possible to fasten the standardized filler neck to the vehicle-specific pipe element and, simultaneously, to fix the holder.

It may also be conceivable to combine a mounting section of the holder to the vehicle-specific pipe element by means of such joining method. Owing to said method, the mounting section of the holder is fixed to the vehicle-specific pipe element.

Preferentially, the vehicle-specific pipe element and the standardized filler neck are made of plastic material and the holder is made of metal. Owing to the plastic material, a variable, i.e. vehicle-specific design has become possible, and the metal holder allows for stable filler neck fastening.

Advantageously, the mounting section is either fork-shaped or annularly shaped and can, thus, enclose the vehicle-specific pipe element at least section-wise. Due to such design, the holder can easily be applied to the vehicle-specific pipe element.

The vehicle-specific pipe element may include a receiving section for positively receiving therein the fork-shaped mounting section of the holder. Thus, the holder is fixed in the receiving section of the vehicle-specific pipe element, and a welding method can then be performed.

Preferentially, the mounting section of the holder is followed by a stabilizing section which preferably is arranged in a substantially rectangular manner and preferentially extends along the vehicle-specific pipe element. Owing to said stabilizing section, the holder can ensure higher stability of the filling device.

Preferentially, the mounting section includes at least one opening for fixing or locking the holder to the vehicle-specific pipe element. Owing to said opening, the holder can easily be fixed to the vehicle-specific pipe element.

Preferentially, the opening of the mounting section can either be U-shaped or designed in accordance with the capital letter omega. If U-shaped, the opening can easily be inserted into a projection; if omega-shaped, the mounting section or the opening of the holder can be locked to a projection of the vehicle-specific pipe element.

Advantageously, a plurality of openings is disposed spaced apart from each other along the circumference of the mounting section of the holder. Consequently, the holder can be fixed to the circumference of the vehicle-specific pipe element more safely via a plurality of mounting points.

Preferentially, the holder includes a plurality of bent sections that are preferably provided with recessed areas. The stiffness of the holder is, thus, improved.

The invention also relates to a construction kit for a filling device, according to any of the preceding claims, comprising at least one vehicle-specific pipe element, one standardized filler neck, and one holder. Thus, the construction kit provides the individual parts for producing said filling device.

Preferentially, the construction kit includes two vehicle-specific pipe elements, preferably three, which can be combined by joining methods, in particular by welding. Owing to such modular design, the filling device can be designed in an especially flexible manner.

The present invention further relates to a method for manufacturing the filling device according to any of the preceding claims, comprising the following steps: providing at least one vehicle-specific pipe element and one holder, inserting the holder into a receiving section of said vehicle-specific pipe element, and attaching a standardized filler neck to said vehicle-specific pipe element in order to fix the holder.

Said method allows manufacturing a filler neck according to a first embodiment of the present invention, wherein fixing the standardized filler neck also means to fix the holder to the vehicle-specific pipe element.

Furthermore, the invention discloses a method for manufacturing a filling device according to any of the preceding claims, comprising the following steps: providing at least one vehicle-specific pipe element and one holder, attaching the holder to the vehicle-specific pipe element, and fixing the holder via a joining method, particularly a welding method, that is used for said vehicle-specific pipe element.

Accordingly, the holder is first attached to the vehicle-specific pipe element and can then easily be fixed to the vehicle-specific pipe element by means of a joining method.

FIGS. 6A to 6E all show examples of another embodiment of the present invention.

In the following, the individual embodiments of the invention and the methods for manufacturing the filling device are explained in more detail.

Figure 1:
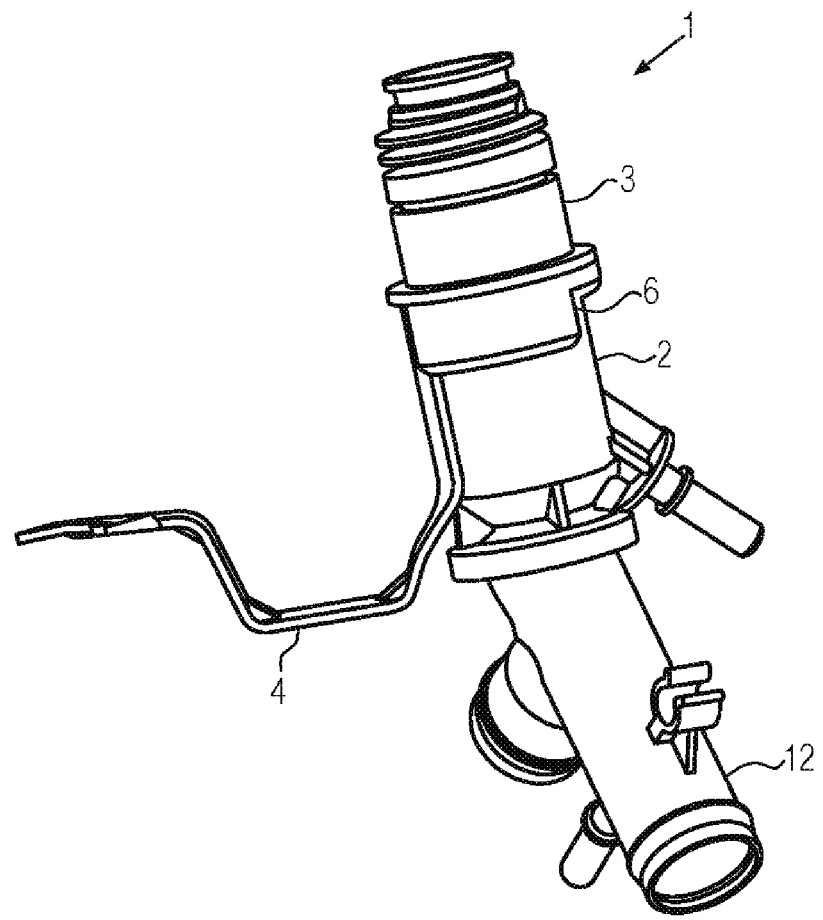
FIG. 1 shows a filling device according to a first embodiment of the invention.
Figure 2:
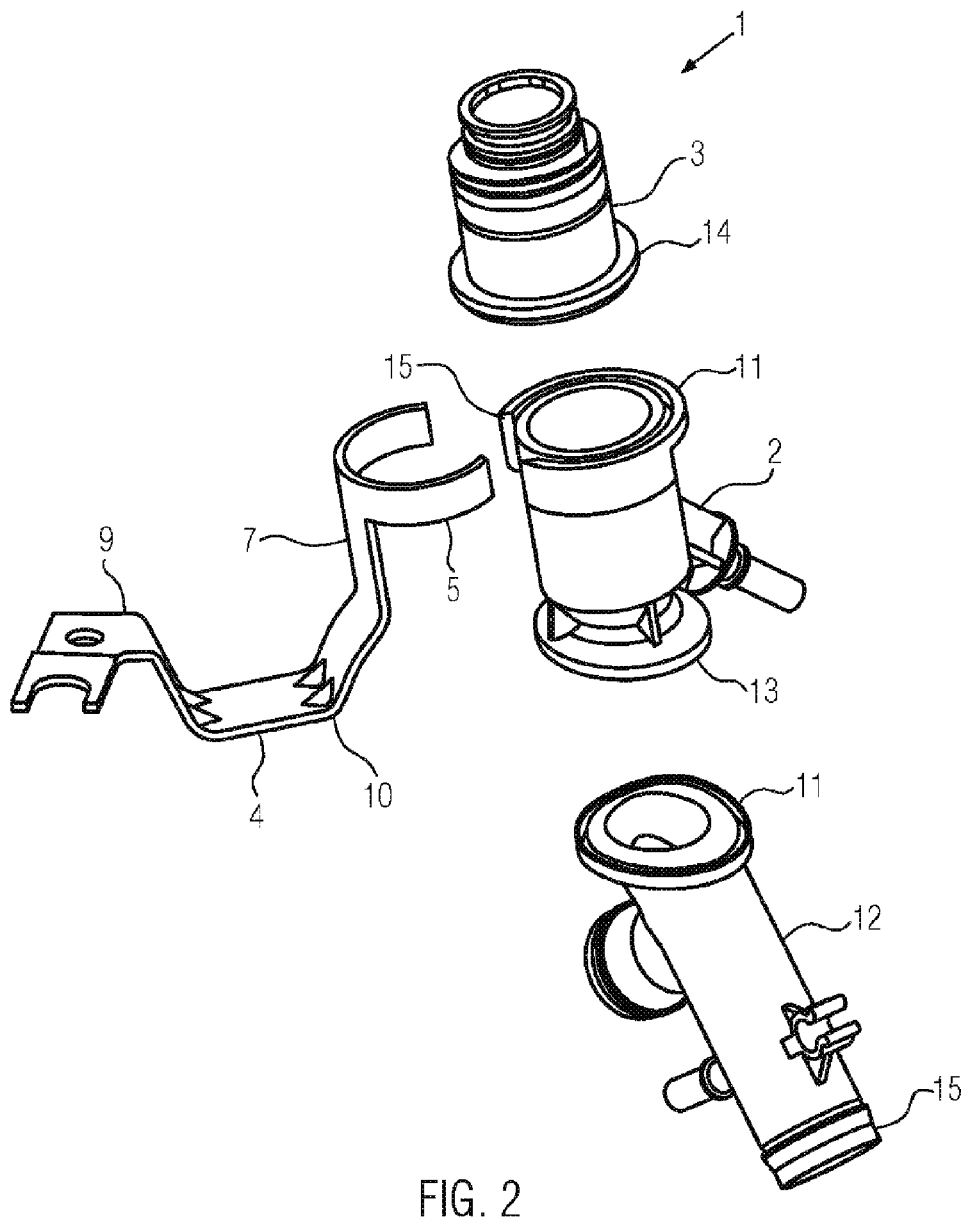
FIG. 2 shows an explosive view of the first embodiment of the invention.

FIGS. 1 and 2 both show a first embodiment of the present invention. According to FIG. 2, a standardized filler neck 3, a vehicle-specific pipe element 2, another vehicle-specific pipe element 12, and a holder 4 are provided. At its lower end, standardized filler neck 3 has an annular joining section 14, and at its upper end it has a thread so as to enable a standard bottle to be screwed to the standardized filler neck 3 for refilling a urea solution into a tank. Standardized filler neck 3 is of substantially cylindrical structure that has been designed in tubular form. Moreover, standardized filler neck 3 is made of a plastic material that can be welded, e.g. by means of ultrasonic welding or sealing. Joining section 14 of filler neck 3 can be inserted into an upper joining section 11 of vehicle-specific pipe element 2, the upper joining section 11 being provided with a recess 15. Beyond, upper joining section 11 is annularly shaped and includes a receiving section 6, as can be seen in FIG. 1. A mounting section 5 of holder 4 can be inserted into the receiving section 6 of vehicle-specific pipe element 2.

Holder 4 includes fork-shaped mounting section 5. A stabilizing portion 7 lying close against the vehicle-specific pipe element extends perpendicularly with regard to mounting section 5. Stabilizing portion 7 can also extend at a different angle with regard to mounting section 5, e.g. at an angle of 180°. Furthermore, holder 4 includes a plurality of bent portions 9, each of said portions 9 being provided with two recessed areas 10. Recessed areas 10 are not necessarily required, so that bent portions 9 are also conceivable without them. Furthermore, stabilizing portion 7 can project away from mounting portion 5 from any direction, depending on the given condition of the installation space available.

Holder 4 is made of metal, however, a plastic material design also being conceivable. As can be seen in FIG. 2, another vehicle-specific pipe element 12 is provided having an upper joining section 11 and a lower joining section 13.

Lower joining section 13 of second vehicle-specific pipe element 12 can be used for receiving a hose or the like therein. Furthermore, said second vehicle-specific pipe element 12 is provided with individual projections for fastening cables etc., and a branch may be provided for venting purposes or the like.

FIG. 1 shows the composite structure of the filling device, with all components of FIG. 2 being composed. It can be seen that standardized filler neck 3 is firmly connected to vehicle-specific pipe element 2 and inserted holder 4 extends along vehicle-specific pipe element 2.

When in the composite state, joining section 14 of standardized filler neck 3 is connected to upper joining portion 11 of vehicle-specific pipe element 2 and lower joining section 13 of vehicle-specific pipe element 2 is connected to upper joining section 11 of the other vehicle-specific pipe element 12.

Figure 3:
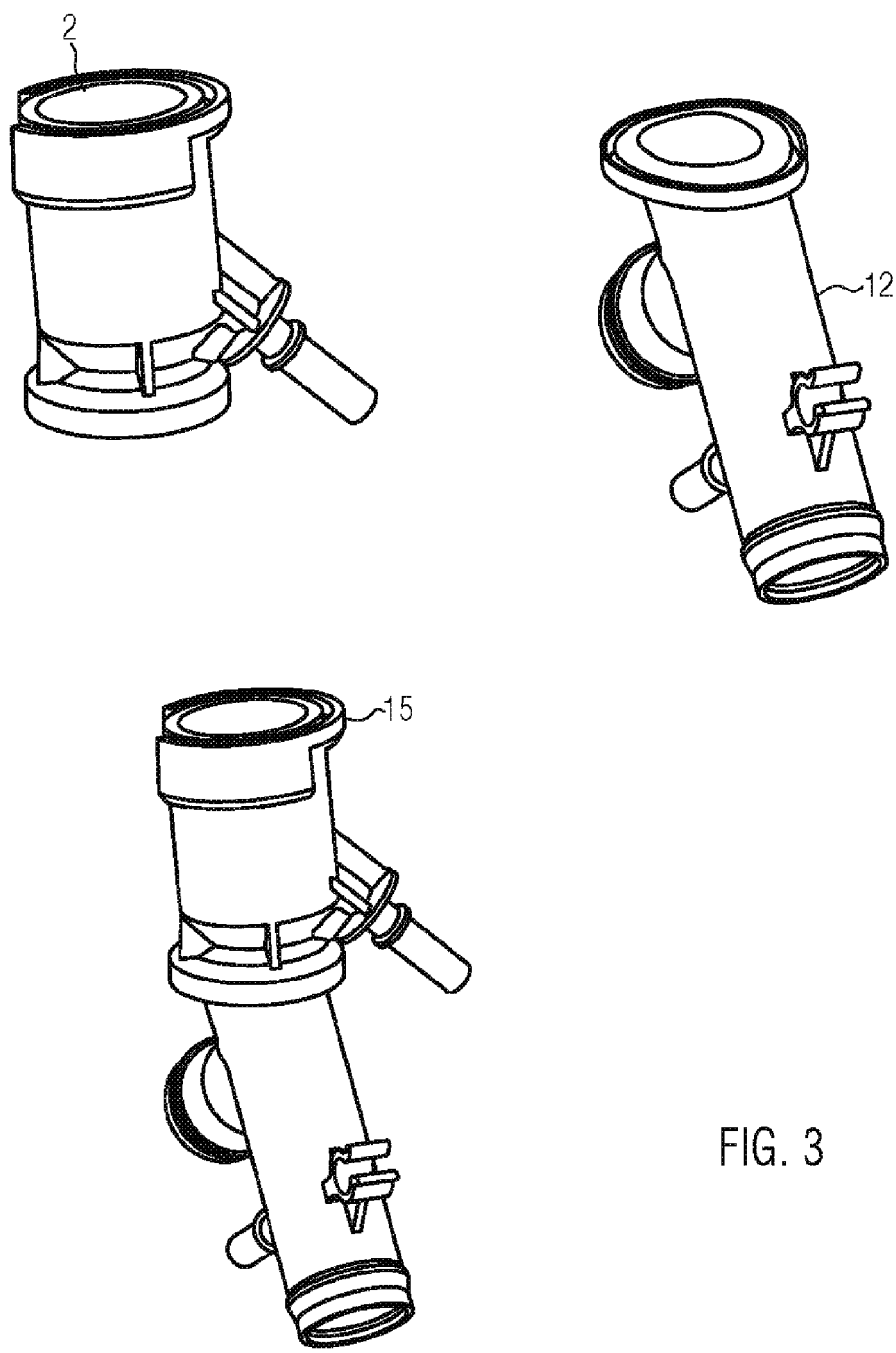
FIG. 3 shows two vehicle-specific pipe elements in a separate and in a composite arrangement.

FIG. 3 shows the two vehicle-specific pipe elements 2 and 12 in separate and composite or welded state.

Figure 4:
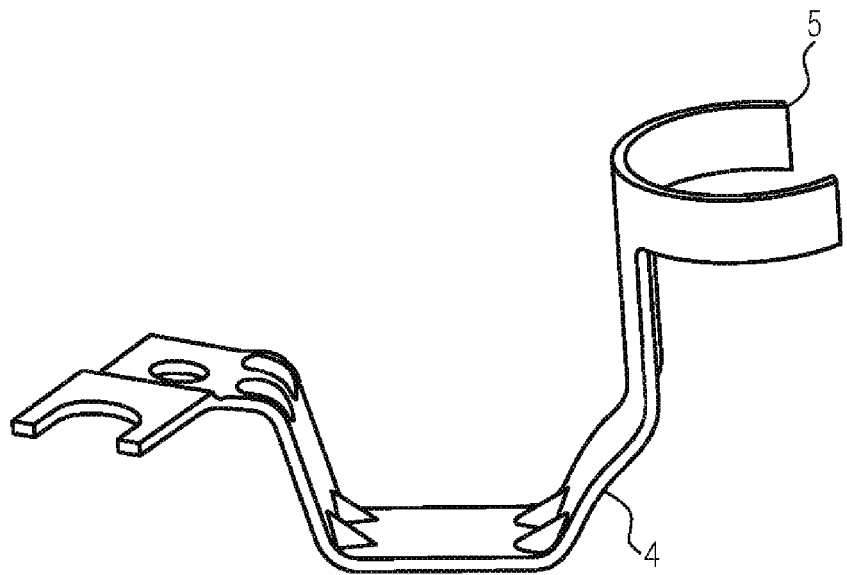
FIG. 4 shows a holder and a filling device according to the first embodiment.
Figure 4:
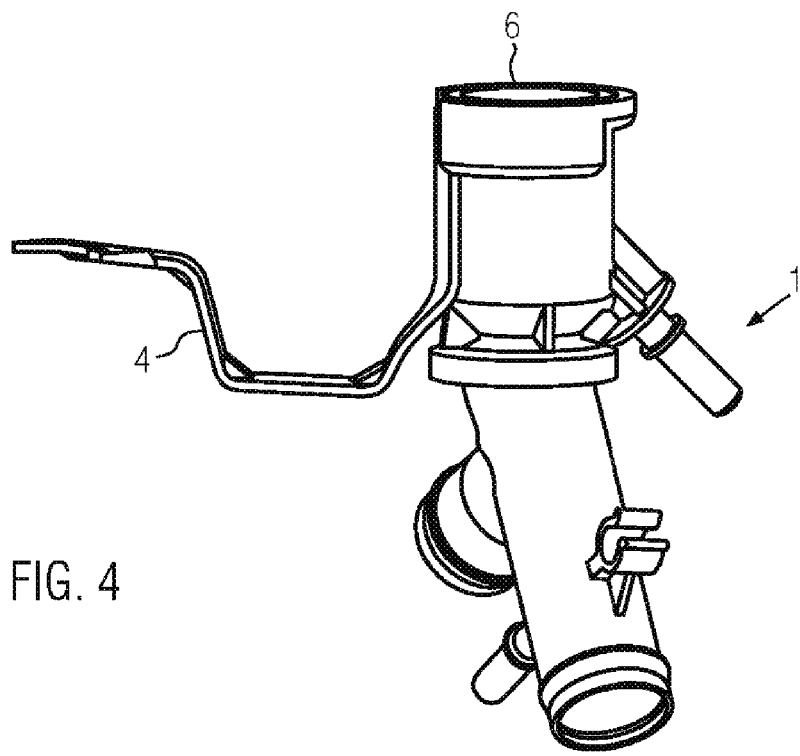

FIG. 4 discloses single holder 4 according to the first embodiment of the invention. The lower drawing of FIG. 4 shows the filling device without standardized filler neck 3, with holder 4 being inserted into recess 15 of vehicle-specific pipe element 2. When in this state, holder 4 is already fixed in a circumferential direction, as recess 15 does not allow any twisting.

Figure 5:
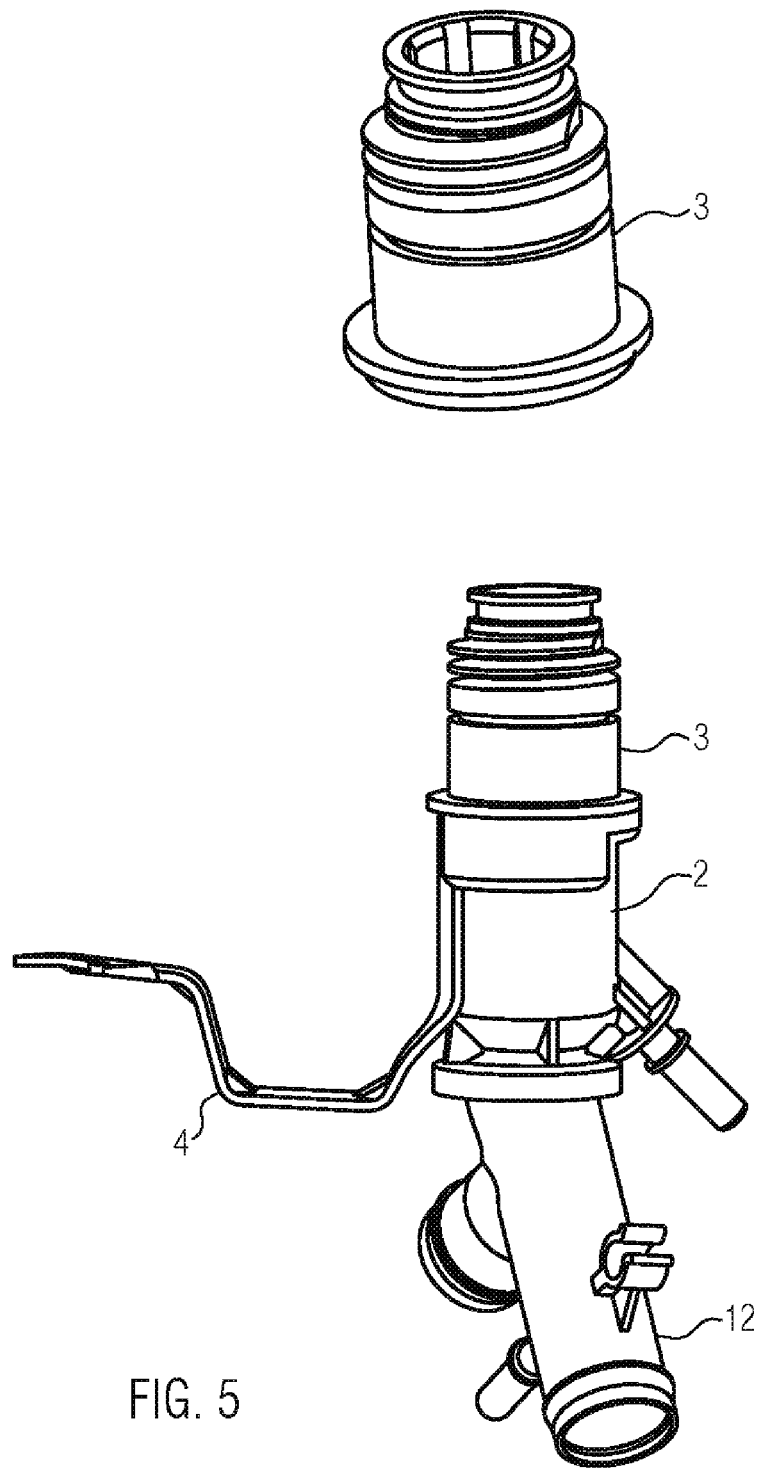
FIG. 5 shows a standardized filler neck and a filling device according to the first embodiment when in the composite state.

As soon as holder 4 is inserted into receiving section 6, standardized filler neck 3 can be inserted and welded according to FIG. 5.

To manufacture the filler device in accordance with the first embodiment of the invention, vehicle-specific pipe element 2 is inserted into the second vehicle-specific pipe element 12 such that upper joining section 11 engages with lower joining section 13.

Both joining sections 11 and 13 are then circumferentially welded together, e.g. by ultrasonic welding. After that, holder 4 is inserted into vehicle-specific pipe element 2, with particularly mounting section 5 of the holder being inserted into receiving section 6 and stabilizing portion 7 being oriented towards recess 15. Thus, holder 4 is secured in this position against twisting and fixed in a longitudinal direction of vehicle-specific pipe element 2.

In a final step, standardized filler neck 3 is attached to vehicle-specific pipe element 2, with upper joining section 11 engaging with joining section 14 of the filler neck and both joining sections 11 and 14 being welded together. As above, such welding may be done e.g. by means of an ultrasonic welding method. When welded, holder 4 is also fixed in a circumferential direction.

The thus produced filling device is of modular structure and can be mounted to a vehicle as an entire module or assembly group.

FIGS. 6A to 6E show a second embodiment of the present invention. A composite state of the filling device is shown, respectively, with standardized filler neck 3 already being fastened to a vehicle-specific pipe element 2. According to FIGS. 6A to 6E, differently designed holders 4 are used, the kind of fastening holder 4 to the corresponding vehicle-specific pipe element 2, however, always being the same.

Figures 6A, 6B:
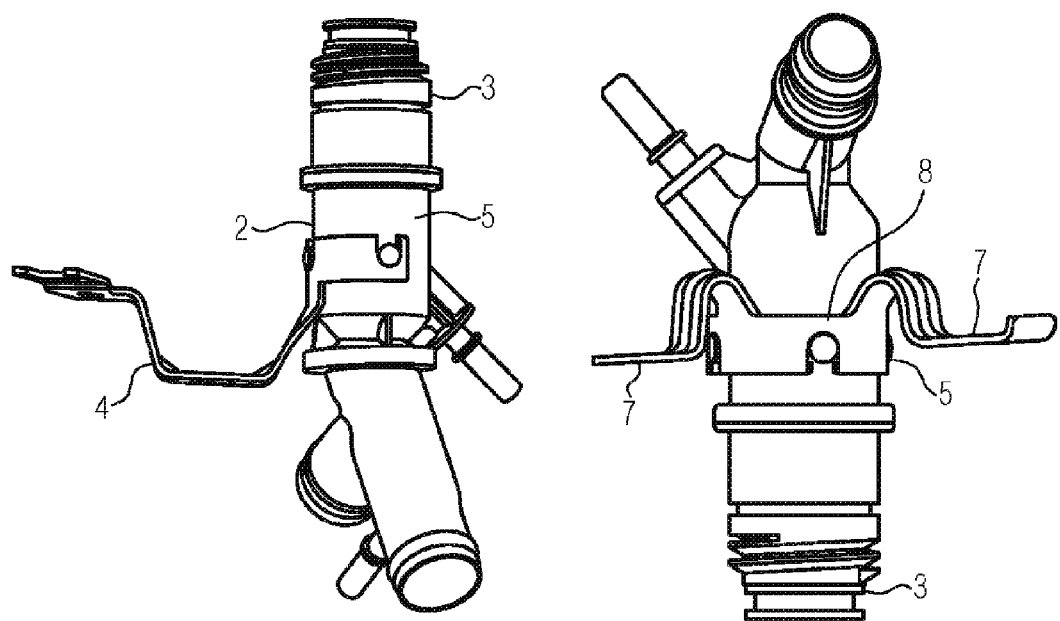

FIG. 6A shows a holder 4 similarly designed as the holder of the first embodiment, mounting section 5 thereof yet being provided with individual openings 8. In the second embodiment, individual openings 8 can be inserted into projections 16. Projections 16 project from an outer surface of vehicle-specific pipe element 2 and are made of a plastic material. Holder 4 is fixed by welding said projections 16 to vehicle-specific pipe element 2.

Figure 6C:
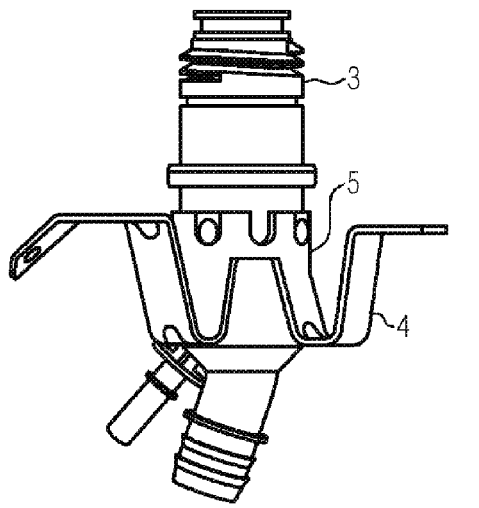
Figure 6D:
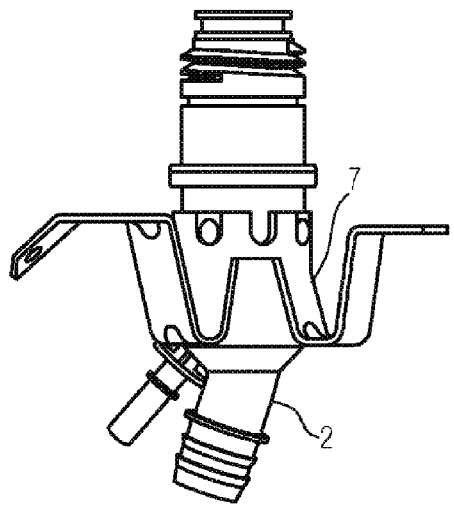
Figure 6E:
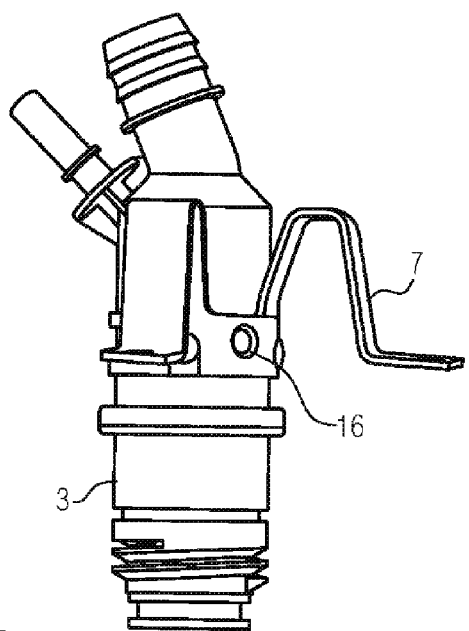

FIG. 6B shows a holder with two stabilizing sections 7, and FIGS. 6C to 6E show a holder 4 with two bent stabilizing sections 7 arranged side by side in circumferential direction of mounting portion 5.

In general, vehicle-specific pipe element 2 of the second embodiment is also made of plastic material and holder 4 of metal, wherein the latter might also be made of plastic material. Standardized filler neck 3 may be mounted in advance to vehicle-specific pipe element 2, which is, however, not inevitably necessary.

According to FIGS. 6A to 6E, vehicle-specific pipe element 2 is provided with individual projections 16 that are circumferentially arranged and may be provided such that they can be inserted into individual openings 8 of mounting section 5 of holder 4. It may also be conceivable to make use of a vehicle-specific pipe element 2 according to the first embodiment and to provide same with projections 16 so that a holder according to the second embodiment can be fastened.

Mounting section 5 is annularly shaped so that same can be affixed to vehicle-specific pipe element 2. The openings can either be U-shaped and/or designed in the form of capital letter omega. If omega-shaped, opening 8 and the corresponding projection 16 can engage with each other. If U-shaped, subsequent welding is required. For welding, projection 16 is heated so that the plastic material starts flowing and projection 16 takes a riveted shape. Thus, holder 4 can be fastened to vehicle-specific pipe element 2 by means of welding. It is not required to have a plurality of openings 8, one opening 8 for fixing holder 4 is generally sufficient.

Hence follows that manufacturing the filling device according to the second embodiment of the invention is done in that holder 4 is attached to vehicle-specific pipe element 2 such that openings 8 engage with projections 16. After that, projections 16 are heated and welded to vehicle-specific pipe element 2, thus fixing holder 4.

Standardized filler neck 3 can be mounted either before or after welding, and additional vehicle-specific pipe elements 12 can be mounted to vehicle-specific pipe element 2.

LIST OF REFERENCE SIGNS 1 filling device
2 vehicle-specific pipe element
3 standardized filler neck
4 holder
5 mounting section
6 receiving section
7 stabilizing section
8 opening
9 bent section
10 recessed area
11 upper joining section
12 another vehicle-specific pipe element
13 lower joining section
14 joining section of the filler neck
15 recess
16 projection

The invention claimed is:

1. A filling device, comprising:
at least one vehicle-specific pipe element;
one standardized filler neck;
one holder;
wherein the holder is fixed to the vehicle-specific pipe element via a joining method used for attaching to the vehicle-specific pipe element in at least one of an axial direction, a radial direction and a circumferential direction of the vehicle-specific pipe element;
wherein the standardized filler neck is connected to the vehicle-specific pipe element by means of the joining method;
wherein the holder includes a mounting section connected to the vehicle-specific pipe element by means of the joining method;
wherein the mounting section is fork-shaped and encloses, at least section-wise, the vehicle-specific pipe element; and
wherein the vehicle-specific pipe element includes a receiving section for positively receiving the fork-shaped mounting section of the holder therein.

2. The filling device according to claim 1, wherein the vehicle-specific pipe element and the standardized filler neck are made of plastic material, and the holder is made of metal.

3. The filling device according to claim 1, wherein the mounting section is followed by a stabilizing section which is arranged in a substantially rectangular manner and extends along the vehicle-specific pipe element.

4. The filling device according to claim 1, wherein the mounting section includes at least one opening by means of which the holder is configured to be fixed or locked to the vehicle-specific pipe element.

5. The filling device according to claim 4, wherein the opening is either U-shaped or designed in accordance with the shape of the capital letter omega.

6. The filling device according to claim 1, comprising:
a plurality of openings, spaced apart from each other, along the circumference of the mounting section of the holder.

7. The filling device according to claim 1, wherein the holder includes a plurality of bent portions that are preferably provided with recessed areas.

8. A construction kit for a filling device according to claim 1, comprising:
the at least one vehicle-specific pipe element;
the standardized filler neck; and
the holder.

9. The construction kit according to claim 8, comprising:
at least two vehicle-specific pipe elements configured to be combined with each other by joining methods.

10. A method for manufacturing a filling device according to claim 1, comprising the following steps:
providing at least one vehicle-specific pipe element and one holder;
inserting the holder into a receiving section of the vehicle-specific pipe element; and
attaching a standardized filler neck to the vehicle-specific pipe element in order to fix the holder.

11. Method for manufacturing a filling device according to claim 1, comprising the following steps:
providing at least one vehicle-specific pipe element and one holder;
attaching the holder to the vehicle-specific pipe element; and
fixing the holder via a joining method that is used for the vehicle-specific pipe element.

12. The filling device according to claim 1, wherein the filling device is configured to fill a tank with a urea solution.

13. The filling device according to claim 1, wherein the joining method for fixing the holder to the vehicle-specific pipe element includes a welding method.

14. The filling device according to claim 9, comprising:
three of the vehicle-specific pipe elements,
wherein the joining methods for combining at least two of the vehicle-specific pipe elements include welding.

15. Method for manufacturing a filling device according to claim 1, comprising the following steps:
providing at least one vehicle-specific pipe element and one holder;
attaching the holder to the vehicle-specific pipe element; and fixing the holder via a joining method that is used for attaching to the vehicle-specific pipe element.

16. A filling device, comprising:
at least one vehicle-specific pipe element;
one standardized filler neck; and
one holder;
wherein the holder is fixed to the vehicle-specific pipe element via a joining method used for the vehicle-specific pipe element in at least one of an axial direction, a radial direction and a circumferential direction of the vehicle-specific pipe element;
wherein the standardized filler neck is connected to the vehicle-specific pipe element by means of the joining method;
wherein the holder includes a mounting section connected to the vehicle-specific pipe element by means of the joining method;
wherein the mounting section includes at least one opening by means of which the holder is configured to be fixed or locked to the vehicle-specific pipe element; and
wherein the opening is either U-shaped or designed in accordance with the shape of the capital letter omega.

* * * * *